United States Patent Office 2,948,679
Patented Aug. 9, 1960

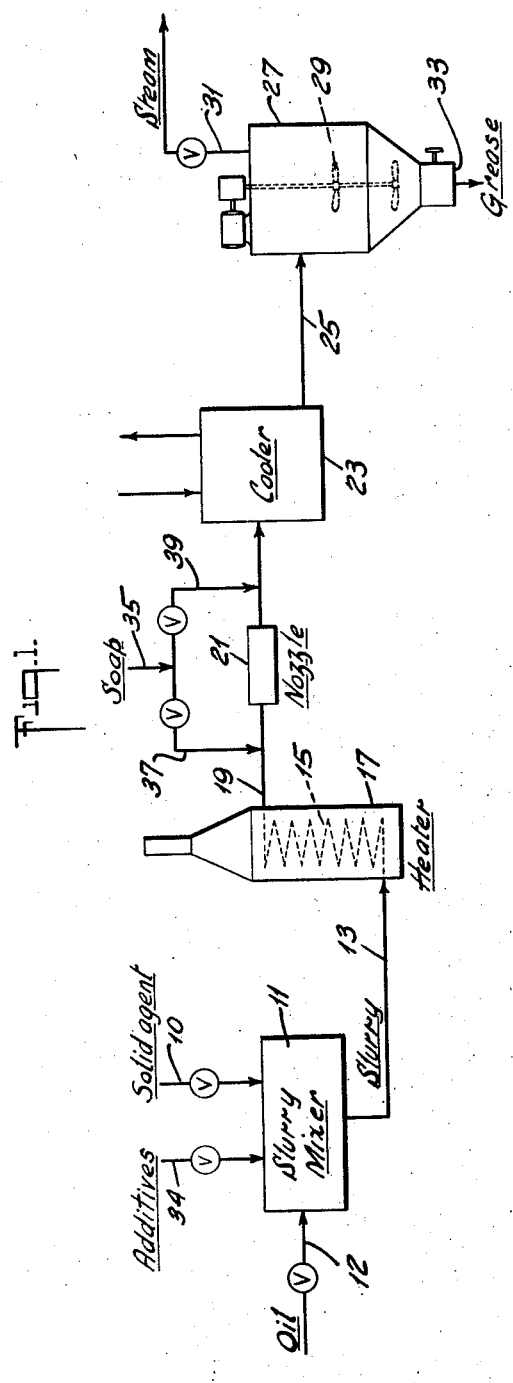
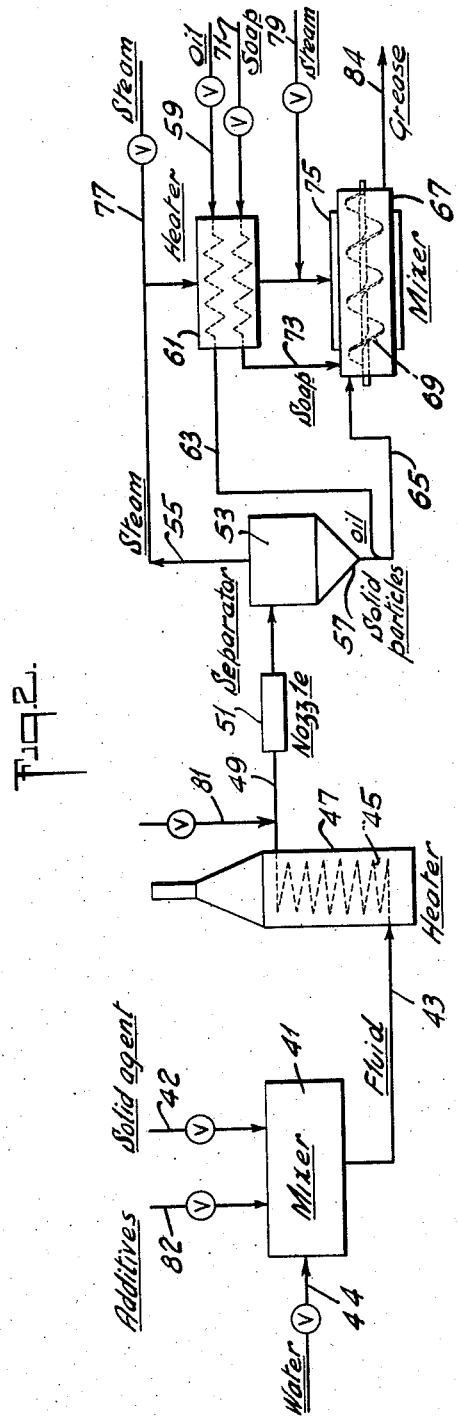

2,948,679

METHOD OF PREPARING SOLID-THICKENED GREASES

Harry V. Rees, Chappaqua, and Lebbeus C. Kemp, Jr., Scarsdale, N.Y., assignors to Texaco Development Corporation, New York, N.Y., a corporation of Delaware Filed Dec. 24, 1953, Ser. No. 400,266

9 Claims. (Cl. 252—28)

The present invention relates to a novel continuous method of, and apparatus for manufacturing grease of the type wherein solid particles are compounded with a lubricating oil, with or without the inclusion of a soap as a gelling agent.

In the past greases have been manufactured which contained particles of solid materials such as silica or carbon, but difficulty was encountered because the grinding of such solid materials to the necessary fineness was an expensive and time consuming procedure, and furthermore could not be fitted satisfactorily into a continuous grease manufacturing process. Also, wetting of some extremely fine solid particles with oil was hard to accomplish.

In accordance with the present invention there is provided a novel continuous method for forming a grease by mixing the solid grease component with a liquid to form a flowable mixture such as a slurry or gel, passing the fluid compound into the initial portion of a long tubular zone, heating the fluid compound in the tubular zone and vaporizing liquid therefrom thereby forming a dispersion of particles of solid material in vapor, passing this dispersion through the latter portion of the tubular zone at high velocity in turbulent flow such that the solid particles impinge against one another and the tube walls and are converted to fine particles of a size suitable for grease manufacture, and at least partially forming the grease by compounding the fine particles with liquid lubricating oil. When the solid particles are such that they do not act as a gelling agent in the lubricating oil, soap should be included in the mixture to complete the formation of the grease. The described procedure is particularly advantageous because a large quantity of solid material can be suspended continuously in a relatively small quantity of fluid, continuous size reduction thus being economically and easily integrated into a continuous grease manufacturing process.

For illustrating the invention two forms of the process outlined generally above will be described. In a first form, solid particles are mixed as a slurry in lubricating oil which is then vaporized in the tubular zone to effect the grinding. The lubricating oil vapors then are condensed to form a thickened dispersion of solid particles in oil, which may be withdrawn. If desired, a soap may be incorporated as by injecting it into the flowing dispersion of solid particles in oil vapors before the condensing step.

In a second form the solid particles or a material from which they can be derived are mixed with water or other suitable liquid to form a fluid compound such as a gel or slurry, and after passage through a heated tubular grinding zone the vapors are separated from the ground solid particles which thereafter are compounded with lubricating oil, with or without the addition of a soap to form a completed grease.

The principles of the invention will be described more in detail below with reference to the drawings, wherein:

Figures 1 and 2 are schematic flow diagrams showing arrangements of apparatus for manufacturing a grease by first and second forms of the process of the invention, respectively.

Referring to Figure 1, relatively coarse particles of a solid unhydrated or hydrated grease component from a supply conduit 10 are mixed with a suitable lubricating oil from conduit 12 in a slurry mixer 11 with or without the addition of conventional additives such as corrosion inhibitors, oxidation inhibitors, and viscosity index improvers (e.g. high mol. wt. polymerized olefins). A continuous stream of slurry compound is then passed at a velocity of ½ to 10 feet per second by a pump through a conduit 13 and into the initial portion of a great length of steel tubing 15 which may be arranged in any desired manner in a heater 17, as in the shape of one or more coils. Heater 17 may be fired in any desired way, as with oil, gas, or coal. While only one heater 17 is shown, it is evident that a series of heaters can be employed, each housing a coil of tubing. Tubing 15 can be of any suitable size, for example ½ to 1 inch tubing 200–800 feet long.

In tubing 15 the oil is heated to a temperature at least above the lower limit of its boiling range, advantageously above the upper limit also, and vaporizes to form a flowing dispersion of particles of solid material in oil vapors. The actual temperature depends upon the particular oil used and the pressure employed, but for substantially complete vaporization in general should be about 100–300° F. above the top of the oil's boiling range, but below about 800° F. to avoid decomposition. Operation at relatively low temperatures is achieved by pulling a vacuum on the system, thus assuring that decomposition will not occur, such operation being especially advantageous when using special fluids such as alcohols, esters and the like having low decomposition temperatures.

Another way to avoid high temperatures is to bleed steam or nitrogen into the system at any selected point, advantageously before the slurry enters the heater 17, to reduce the partial pressure of the fluid.

The dispersion of solids in vapors flows at a high velocity, advantageously in excess of 100 feet per second (f.p.s.) and in a highly turbulent manner through the latter portion of the tubing 15 and a conduit 19. During its passage through tubing 15 and conduit 19 the solid particles are greatly reduced in size by forcible impingement against one another and the walls of the tubing. Some materials may tend to erode coil 15 if they flow at high velocity therein. To prevent such erosion the velocity in coil 15 is kept low, say below 100 f.p.s., and most of the size reduction is accomplished by passing the dispersion at high velocity through a tubular nozzle 21 in the conduit 19. Nozzle 21 may have any suitable shape to increase velocity and reduce pressure, such as that of a convergent or convergent-divergent orifice having a throat which, for example, may have a diameter of ⅛ to 3/16 inch. Size reduction also may be accomplished by passing the dispersion at high velocity through a pair of opposed nozzles so that streams impinge against one another at 180° or less. Such nozzles can be fed from a pair of heater coils, or the effluent from one heater coil can be split and fed to both nozzles.

The vaporous dispersion then enters a cooler 23 wherein a cooling medium such as water is circulated in heat exchange relationship therewith, as by flowing over a series of tubes carrying the dispersion. In the cooler the temperature of the vaporous dispersion is reduced only sufficiently to condense the oil vapors while any uncondensible gas or water which may be present is maintained in the vapor state.

From cooler 23 the liquefied dispersion flows through a conduit 25 into a collecting hopper 27, wherein it is agitated continuously by a motor-driven stirrer 29 to assure separation of any steam bubbles therefrom, the steam passing off by way of a conduit 31 at the top of the hopper. The liquid product is withdrawn from the bottom of hopper 27 through a valve-controlled outlet 33. Instead of removing steam in hopper 27, or in addition thereto, there may be employed a centrifugal separator between it and the cooler 23, through which air is blown from the bottom to assist in getting rid of steam.

The product in hopper 27 will be a grease when the solid particles are of a material that has a gelling action on the lubricating oil. However, when the solid particles are of a material which has little or no gelling action on the lubricating oil a quantity of soap should be introduced into the dispersion to supplement the solid particles in their thickening or gelling action. Soap may be injected at any place in the system between the mixer 11 and the outlet 33. We have shown by way of illustration the introduction of soap from a supply conduit 35 into the discharge tube 19, alternatively through a valve-controlled conduit 37 upstream of nozzle 21 or a valve-controlled conduit 39 downstream of the nozzle.

When the soap is injected upstream of the nozzle it is intimately and thoroughly mixed with the vaporous dispersion as it passes through nozzle 21 at high velocity. A less thorough, but still effective, mixing can be expected when the soap enters conduit 19 downstream of the nozzle, or when no nozzle is used. It is apparent that soap also may be added in the hopper 27 where it is thoroughly mixed with the oil dispersion by the stirrer 29.

The following specific exaxmples illustrate how the form of the invention described in connection with Figure 1 can be applied to prepare specific grease compositions.

*Example I*

A slurry is made up consisting 82% by weight of a mineral oil having a viscosity of 41 SUS (Saybolt Universal seconds) at 100° F. and a boiling range of 534–700° F., together with 18% weight of graphite fragments averaging about ⅛ inch in diameter. 2200 lbs./hr. of this slurry are pumped into ½" heater tubing 15, 600 feet long wherein it is heated to a temperature of 750° F. and vaporizes, the resulting dispersion reaching a velocity in excess of 500 feet per second. Nozzle 21 is omitted. Thereafter the dispersion enters the cooler 23, and the resulting dispersion of ultra fine carbon particles in oil is discharged into the hopper 27 as a highly liquid hot grease which is withdrawn through outlet 33.

*Example II*

A slurry consisting 18% of graphite fragments and 82% of mineral oil is passed through th esystem of Figure 1 as described in Example I. A hot sodium stearate soap at a temperature of 250° F. is introduced through conduit 37 in a steady stream flowing in such volume as to provide a mixture containing about 15% of soap. The resulting grease leaving the outlet 33 has a thicker consistency than that described in Example I and sets up to form a relatively thick and viscous grease when cooled.

*Example III*

A slurry composed about 40% by weight of silica gel particles (containing 60% water by weight) 2–4 mesh in size (U.S. standard), and about 60% of a naphthene base lubricating oil having a viscosity of about 310 SUS at 100° F. and a boiling range of 619–878° F. is made up in the slurry mixer 11. 800 lbs./hr. of this slurry are pumped through the conduit 13, and a ½" heater tub 400 feet long where it is heated to 800° F. and the water of the silica gel and most of the oil content of the slurry are vaporized. The resulting dispersion attains a velocity in excess of 1000 feet per second in passing through nozzle 21. The oil is then condensed in cooler 23 by cooling the vapors to a temperature of 400° F. while the water vapor from the silica gel remains in the vaporous condition. The resulting liquid grease containing ultra fine particles of silica is then passed into the receiver 27 wherein the grease is agitated to cause entrapped water vapor to separate and pass out through conduit 31.

*Example IV*

The same mixture of silica gel and lubricating oil is made up and passed through the system of Figure 1 as described in Example III. The gelling action of the ultra fine silica however, is supplemented by bleeding in hot liquid sodium stearate soap at a temperature of 350° F. through conduit 37 in a volume to provide 5% of soap by weight in the final mixture.

Referring to Figure 2 of the drawings, a second embodiment of the invention involves forming in a mixer 41 a fluid compound of the solid grease component from supply conduit 42 with a liquid from conduit 44, suitable additives also being introduced through conduit 82 if desired. Preferably the slurry employs as the liquid component water or another easily vaporizable liquid other than the oil of the final grease. The slurry is then pumped through a conduit 43 into a long heating tube 45 which may be coiled or otherwise arranged within a gas or oil fired heater 47. The water or other slurry liquid is vaporized by heating it to a temperature well above its boiling point, and a dispersion of solid particles in the resulting vapor is formed which flows continuously at high velocity in turbulent flow through the latter portion of tubing 45.

The resulting dispersion then passes by a conduit 49 through a nozzle 51 of the type described in connection with Figure 1, and then into a separator 53 wherein the vapor is separated from the solid particles, the vapor passing off the top through a conduit 55 and the dry solid particles passing continuously out the bottom through an outlet 57. Nozzle 51 is not essential and may be omitted if desired. Separator 53 may have any desired conventional construction such as that of a cyclone separator wherein the vapor is separated from the solid particles by centrifugal action, with or without the addition of air blowing up through the separator from the bottom to dry the solid.

After the solid particles leave separator 53 a grease is compounded by mixing a lubricating oil with the particles and, where necessary, by also adding soap to effect gellation. Lubricating oil is supplied by a condut 59 to a heater 61 and thence by a conduit 63 into the outlet conduit 57 for mixture with the solid particles. The resulting suspension flows by conduit 65 into a mixer 67 of any suitable conventional construction, such as one having a motor-driven spiral mixing screw 69.

When the solid particles are of a material such as silica which has a gelling action on lubricating oil it frequently is not necessary to add a soap. However, when a soap is necessary to effect gellation or to supplement the action of the solid particles, it is supplied by a conduit 71 to a heater 61 and thence by a conduit 73 into the mixer 67 wherein it is intimately combined with the oil and solid particles.

The economy of operation is improved by using steam from the top of the separator 53 as the heating medium for the heater 61. Process steam also is passed from heater 61 through a jacket 75 surrounding mixer 67 for heating the grease during compounding. This process steam may be supplemented by the addition of auxiliary steam form conduits 77 and 79.

Some solids such as silica can only be wet with great difficulty by the oil employed for making a grease. This difficulty can be alleviated by incorporating a small quantity of oil, such as 1 to 5%, in the liquid component of the slurry in mixer 41, vaporizing the oil with the slurry liquid, and then controlling the temperature in separator 53 by suitable cooling fluid so that only the oil condenses uniformly on the individual fine solid particles. Another way is to introduce the oil into line 49 either before or after the nozzle 51 and allow it to condense on the surfaces of the particles in 53. The resulting oil-wet particles are easily compounded with lubricating oil to form the grease. Other suitable materials for improving oil wettability are alkali and alkaline earth metal petroleum sulfonates such as sodium and potassium petroleum sulfonates, these materials also acting as dispersing agents to improve the suspension of solid particles in slurry liquid. Still others are acids and naphthenates.

Wettability of the solid particles can also be improved by mixing in the slurry feed a small quantity say up to 2% by weight, of iron or lead salts such as the chloride or nitrate and subsequently bleeding in hydrogen sulfide through a conduit 81 or in the separator 53 to form the sulfide which conditions the particles for oil wettability.

The following examples will illustrate how the method described in connection with Figure 2 is carried out to produce specific grease compositions.

Example V

Fragments of graphite about ⅛ inch in diameter are mixed with water in the mixer 41 to form a slurry containing 50% by weight of graphite which is then passed at the rate of 700 lbs./hr. through the heated tubing 45 for disintegrating the graphite. A velocity in excess of 1700 feet per second is attained by passage through 45. In the separator 53 the steam is separated and passes off through conduit 55 leavingt dry hot finely divided carbon particles in the bottom of the separator. A stream of a paraffinic lubricating oil having a viscosity of about 300 SUS at 210° F. is then passed through the heater 61 wherein it is heated to a temperature of 220° F. and enters the conduit 65 for mixture with the carbon particles leaving separator 53. The proportions are such as to produce a final grease containing 25% by weight of carbon and 70% by weight of mineral oil. The resulting crude mixture of carbon and oil is delivered to mixer 67 while a stream of hot aluminum stearate soap at 350° F. is simultaneously supplied from conduit 73 in sufficient volume to provide 5% by weight of soap in the final grease. After mixing thoroughly in the mixer 67 at a temperature of 350° F. the finished liquid grease is discharged through outlet 84.

Example VI 23.69 parts of silica gel particles 2–4 mesh in diameter is mixed thoroughly in the mixer 41 with 76.31 parts of water by weight so that the major portion of the silica gel forms a liquid gel with the water. The resulting fluid is passed at a rate of 1109 pounds per hour through the ½ inch tubular heating coils 45 wherein the water is heated to 754° F. and vaporizes to form a dispersion flowing at a velocity in excess of 2000 feet per second. After passing into separator 53 the steam is removed through conduit 55 and finely-divided spherical silica particles leave through outlet 57, having been reduced in size to between .005 and 7 microns diameter. Hot mineral oil of about 300 SUS viscosity at 100° F. is then supplied through conduit 63 in volume such as to provide a final grease consisting 85% of mineral oil and 15% of silica by weight. This mixture is then passed into the mixer 67 where an intimate dispersion is accomplished at a temperatuer of 250° F., after which liquid grease is discharged through outlet 84.

Example VII

Silica as described in Example VI is mixed with oil from conduit 63 in proportions to provide about 15% by weight of silica and 80% by weight of lubricating oil in the final product. This mixture is then passed into mixer 67 which simultaneously is supplied with a sodium stearate soap from conduit 73 in volume to provide 5% by weight of soap in the final grease. After intimate mixing at a temperature of 300° F. the resulting liquid grease is discharged through outlet 84.

The principles of the invention have been illustrated above in connection with specific grease components. It is apparent, however, that they also apply when a wide variety and range of other components are employed. For example, solid particles of many other gelling agents may be used, such as alumina, magnesia; calcium or magnesium hydroxides; ferrous of ferric oxides and hydroxides; vanadium oxide; silicates of magnesium, calcium, and aluminum; calcium sulfate, calcium carbonate, calcium phosphate, clay, and various forms of carbon such as carbon blacks. Such gelling agents may be employed in amounts between 1 and 25% of the final grease by weight, the amount in any specific case depending upon the characteristics of the particular gelling agent employed, the grease consistency desired, and the quantity of soap used in conjunction therewith.

Extremely fine sub-division of the particles is necessary, and it is advantageous that they be fine enough so that one gram has a surface area of 200 to 750 square meters as determined by adsorption of a mono-layer of nitrogen.

All solid materials do not necessarily have a gelling action on lubricating oil. Substances which do not, however, often are used in conjunction with gelling agents to impart specific properties to the grease. Among such additives are asbestos, mica, and talc, all of which may be incorporated in a grease by following the present invention. Others are antimony sulfide; metal powders such as aluminum, lead, zinc, and copper; borax, barium sulfate, tricresyl phosphate, and sodium metaphosphate. Such additives may be introduced into the intial mixture through conduits 34 and 82 or at any other selected point.

The oil phase of a grease also can be varied widely, as is well known in the art. In general the oil phase can be composed of lubricating oil fractions of petroleum, which are a mixture of naphthenic, aliphatic, and aromatic hydrocarbons. When a natural mineral base lubricating oil is employed it may have a viscosity between 35 SUS at 100° F. and 1,000 SUS at 210° F. depending upon the characteristics of the desired final grease product. Synthetic lubricants, such as the water soluble monoalkyl ethers of oxy-ethylene-oxy-1,2,-propylene copolymers, may also be employed. One such synthetic lubricant sold by Carbide and Carbon Chemicals Corporation under the trademark "Ucon" fluid has viscosities between 100 and 660 SUS at 100° F.

The types of soap used in greases are well known in the art and may be employed in the method of the present invention to produce a grease of the desired final characteristics. Metal soaps of aliphatic dicarboxylic fatty acids and hydroxy acids having more than 11 carbon atoms are generally employed, for example, salts of oleic, palmitic, myristic, arachidic, stearic, hydroxy stearic, and behenic acids. Other acids are sulfonic, rosin and naphthenic. Typical metal radicals in soaps are aluminum, lead and lithium, for example as aluminum stearate, lead 12-hydroxy stearate, or lithium 12-hydroxy stearate. Other metallic radicals include one or more of copper, cobalt, nickel, cadmium, mercury, strontium, zinc, sodium, and iron.

A soap may also be formed in situ by incorporating a soap-forming base such as aluminum hydroxide in the original slurry or gel in mixer 11 or 41, and then later adding a high molecular weight acid such as stearic to the mix after the latter has left the heating coils.

Obviously many modifications and variations of the invention as hereinbefore set forth may be made without departing from the spirit and scope thereof, and therefore only such limitations should be imposed as are indicated in the appended claims.

We claim:

1. In a continuous method for compounding a grease including a petroleum lubricating oil and finely-divided particles of a solid gelling agent, mixing relatively coarse particles of said solid gelling agent with said oil in a grease thickening proportion to form a flowable mixture;

passing said flowable mixture into the initial portion of a long tubular zone; heating said flowable mixture at least to above the lower limit of the boiling range of said oil thereby vaporizing said oil and forming in said tubular zone a dispersion of particles of said solid in the vapor of said oil; passing said dispersion of solid particles in oil through the latter portion of said tubular zone at high velocity in turbulent flow such that said solid gelling agent is converted to fine solid particles of a size reduced greatly below the original size of said particles and sufficiently fine to cause gelling of said oil upon subsequent cooling; and cooling said dispersion to condense said oil vapors and form a gelled suspension of said fine solid particles therein.

2. A method in accordance with claim 1 wherein said gelling agent is at least one substance selected from the group consisting of silica, alumina, magnesia, calcium hydroxide, magnesium hydroxide, iron oxide and hydroxide, vanadium oxide; silicates of magnesium, calcium, and aluminum; calcium sulfate, calcium carbonate, and calcium phosphate; clay, and carbon.

3. A method in accordance with claim 1 wherein said gelling agent is silica.

4. A method in accordance with claim 1 wherein said gelling agent is carbon.

5. A method in accordance with claim 1, also comprising introducing soap into said tubular zone to mix with said dispersion.

6. A method in accordance with claim 1, also comprising passing said dispersion through a pressure reducing nozzle at high velocity before cooling said dispersion.

7. A method according to claim 1 wherein said fluid energy grinding is effected by passing the dispersion at high velocity as mutually opposed impinging streams.

8. A method according to claim 1 in which said fluid energy grinding is effected by passing said dispersion through an extension of said tubular zone at high velocity in turbulent flow.

9. A method in accordance with claim 1, wherein said fine solid particles are so fine that one gram has a surface area of 200 to 750 square meters.

References Cited in the file of this patent

UNITED STATES PATENTS

| | | |
|---|---|---|
| 1,817,958 | Zwilgmeyer | Aug. 11, 1931 |
| 2,021,143 | Calcott | Nov. 19, 1935 |
| 2,086,997 | Stubner | July 13, 1937 |
| 2,127,026 | Grindrod | Aug. 16, 1938 |
| 2,249,767 | Kistler | July 22, 1941 |
| 2,260,625 | Kistler | Oct. 28, 1941 |
| 2,588,853 | Kumins | Mar. 11, 1952 |
| 2,660,564 | Davis | Nov. 24, 1953 |

UNITED STATES PATENT OFFICE
CERTIFICATE OF CORRECTION

Patent No. 2,948,679            August 9, 1960

Harry V. Rees et al.

It is hereby certified that error appears in the printed specification of the above numbered patent requiring correction and that the said Letters Patent should read as corrected below.

Column 1, line 33, for "fluid compound" read -- flowable mixture --; line 34, for "fluid compound" read -- mixture --; column 3, line 11, before "grease" insert -- gelled suspension or --; line 13, after "oil" insert -- and are sufficiently fine and present in a grease thickening proportion --; line 69, for "tub" read -- tube --; column 5, line 28, for "leavingt" read -- leaving --; lines 61 and 62, for "temperatuer" read -- temperature --; column 6, line 6, for "of" read -- or --; same line 6, after "ferric" insert -- iron --.

Signed and sealed this 4th day of April 1961.

(SEAL)
Attest: ERNEST W. SWIDER

Attesting Officer

ARTHUR W. CROCKER
Acting Commissioner of Patents